US006320480B1

(12) United States Patent
Kintis et al.

(10) Patent No.: US 6,320,480 B1
(45) Date of Patent: Nov. 20, 2001

(54) WIDEBAND LOW-LOSS VARIABLE DELAY LINE AND PHASE SHIFTER

(75) Inventors: Mark Kintis, Manhattan Beach; Daniel K. Ko, Monterey Park; Stephen A. Maas, Long Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/426,619

(22) Filed: Oct. 26, 1999

(51) Int. Cl.[7] ................................ H04B 3/04; H01P 1/18
(52) U.S. Cl. ............................................ 333/156; 333/20
(58) Field of Search ............................ 333/156, 20, 138, 333/236, 245; 343/778

(56) References Cited

U.S. PATENT DOCUMENTS

| | | | | |
|---|---|---|---|---|
| 3,091,743 | | 5/1963 | Wilkinson | 333/127 |
| 3,609,573 | | 9/1971 | Hair | 257/664 |
| 3,988,705 | | 10/1976 | Drapac | 333/109 |
| 4,375,054 | | 2/1983 | Pavio | 333/116 |
| 4,825,177 | | 4/1989 | Teague et al. | 330/295 |
| 5,304,944 | * | 4/1994 | Copeland et al. | 330/149 |
| 5,563,558 | | 10/1996 | Mohwinkel et al. | 333/127 |
| 5,629,553 | * | 5/1997 | Ikeda et al. | 257/531 |
| 5,804,921 | * | 9/1998 | McEwan et al. | 315/20 |

OTHER PUBLICATIONS

"GaAs Nonlinear Transmission Lines for Picosecond Pulse Generation and Millimeter–Wave Sampling" by Rodwell, et al. *IEEE Transactions on Microwave Theory and Techniques*, vol. 30, No. 7, Jul. 1991, pp. 1192–1204.

"Novel Low–Loss Delay Line for Broadband Phased Antenna Array Applications" by Zhang, et al. *IEEE Microwave and Guided Wave Letters*, vol. 6, No. 11, Nov. 1996, pp. 395–397.

"Electronic Communication Techniques" by Paul H. Young, Charles E. Marrow Publishing Company, copyright 1985, pp. 477–479.

"Communication Technology Handbook" by Geoff Lewis, Butterworth–Heinemann Publishing Company, copyright 1994, pp. 197 and 198.

* cited by examiner

*Primary Examiner*—Robert Pascal
*Assistant Examiner*—Kimberly E Glenn
(74) *Attorney, Agent, or Firm*—Katten, Muchin & Zavis

(57) ABSTRACT

A programmable phase shifter (20, 40, 54, 60, 62) includes a variable delay line formed from a nonlinear transmission line (NLTL) (26, 28, 46, 28), which enables the device to be used in applications where the frequency of the input signal varies. A variable DC bias applied to the NLTL (26, 28, 46, 48) varies the NLTL's phase velocity and delay. Since the characteristic impedance of a transmission line changes as a function of the DC bias, the input voltage standing wave ratio (VSWR) also changes. In order to compensate for the change in the input VSWR, a pair of NLTLs (26, 28, 46, 48) are coupled at the input and output to a pair of hybrid couplers (22, 42). In an alternate embodiment of the invention, the hybrid couplers (22, 24) are replaced with 180° power splitters (42, 44) in order to reduce distortion of the device. In other embodiments of the invention (40, 54), a nonlinear transmission lines are used to form both discretely variable and continuously variable digital phase shifters (60, 62).

13 Claims, 5 Drawing Sheets

WIDEBAND LOW-LOSS VARIABLE DELAY LINE AND PHASE SHIFTER

CROSS REFERENCE TO RELATED APPLICATIONS

This application is related to commonly owned co-pending Application, filed on even date, for a Variable Delay Line Detector by Marshall Huang, Mark Kintis, and Robert Kasody, Ser. No. 09/427,453.

BACKGROUND OF THE INVENTION

1. Field of the Invention

The present invention relates to phase shifters and more particularly to phase shifters with variable time delays.

2. Description of the Prior Art

Phase shifters are generally known in the art. Such phase shifters are used in a relatively wide variety of electronic and microwave applications, such as phased array antenna systems. Examples of such phase shifters are disclosed in commonly owned U.S. Pat. No. 5,606,283, hereby incorporated by reference. Phase shifters can generally be grouped into two categories. One category of phase shifters is based upon materials having a variable permeability. This type of phase shifter typically includes a thin ferrite rod, centered within a rectangular waveguide. A magnetic field applied to the ferrite rod by means of an induction coil wrapped around the waveguide varies the permeability of the ferrite rod, thus controlling the propagation velocity and therefore the phase shift of signals carried by the waveguide. In another type of phase shifter, different signal path lengths are used to control the phase shift of a signal. This type of phase shifter is known to include a bank of switching diodes and various lengths of transmission lines that are switched into or out of the signal path by the diodes to control the propagation delay and therefore the phase shift of the signals carried by the transmission lines.

There is a problem with known phase-shifting devices. In particular, such phase-shifting devices cannot be tuned and thus must be used in applications where the frequency of the input signal is constant. Such devices cannot be used in applications, such as spread spectrum applications, in which the frequency of the input signal varies. Thus there is a need for a phase shifting device which can be programmed in real time to enable the device to be utilized with input signals whose frequency varies.

SUMMARY OF THE INVENTION

Briefly, the present invention relates to phase shifters which include variable delay lines which enable the device to be used in applications where the frequency of the input signal varies. Various embodiments of the present invention are provided. Each embodiment of the invention includes a nonlinear transmission line (NLTL). In such NLTLs, changing the DC bias applied to the NLTL varies the phase velocity of the transmission line. Since the characteristic impedance of the transmission line also changes as a function of the DC bias, the input voltage standing wave ratio (VSWR) also changes. In order to compensate for the change in the input VSWR, in one embodiment of the invention, a pair of NLTLs are provided in parallel, coupled to the input and output of the device by way of a pair of hybrid couplers. Such a configuration balances the input and output VSWR of the device. In an alternate embodiment of the invention, the hybrid couplers are replaced with 180° power splitters in order to reduce the distortion of the device.

In other embodiments of the invention, nonlinear transmission lines are used to form discretely variable digital phase shifters.

BRIEF DESCRIPTION OF THE DRAWINGS

These and other advantages of the present invention will be readily understood with reference to the following specification and attached drawing wherein.

DETAILED DESCRIPTION

Figure 3:
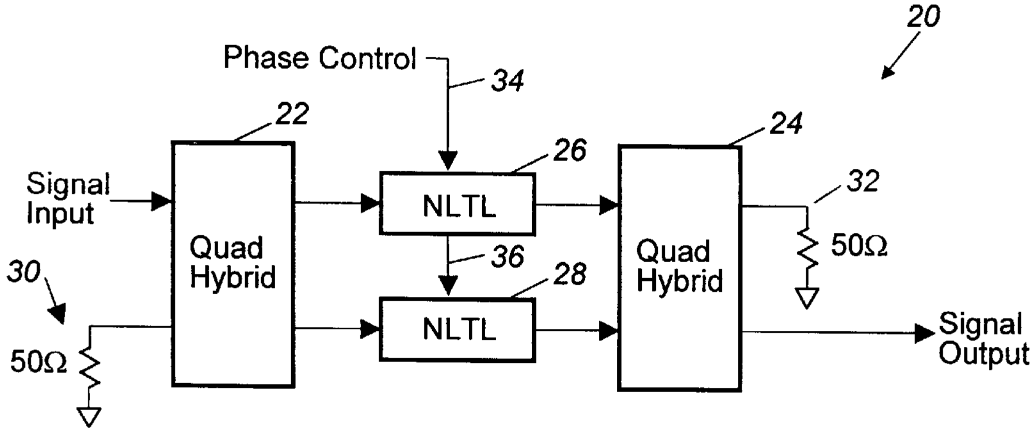
FIG. 3 is a block diagram of a low-loss variable-delay-line phase shifter device in accordance with one embodiment of the present invention.
Figure 4:
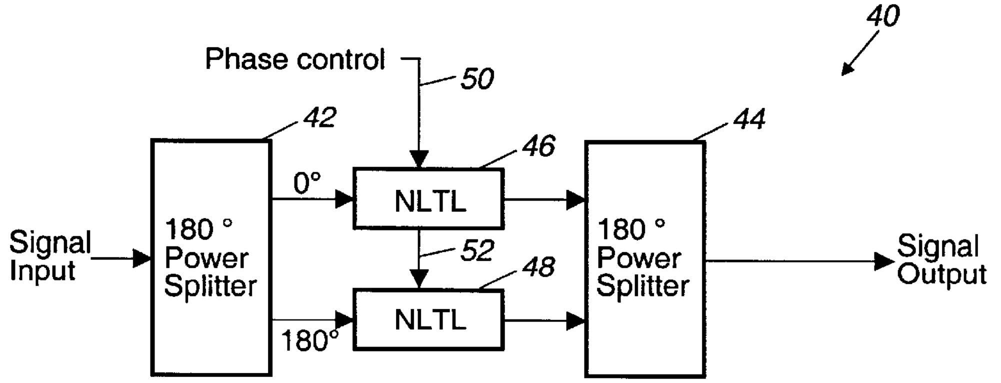
FIG. 4 is a block diagram of an alternate embodiment of the invention exhibiting low distortion.
Figure 5A:
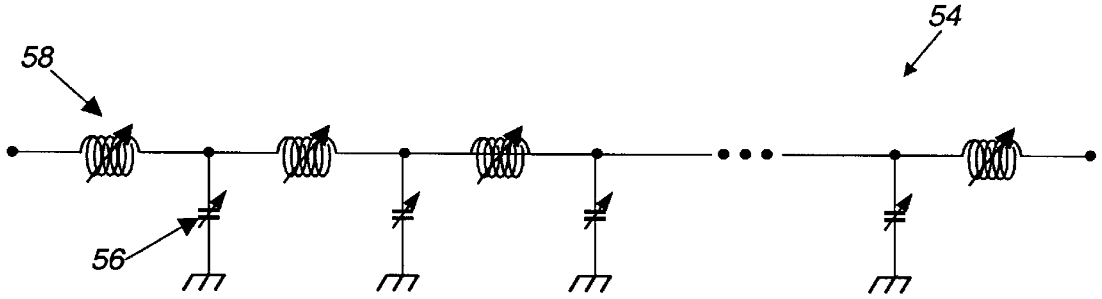
FIG. 5*a* is a schematic representation of a variable-inductance NLTL phase shifter in accordance with another embodiment of the present invention.
Figure 5B:
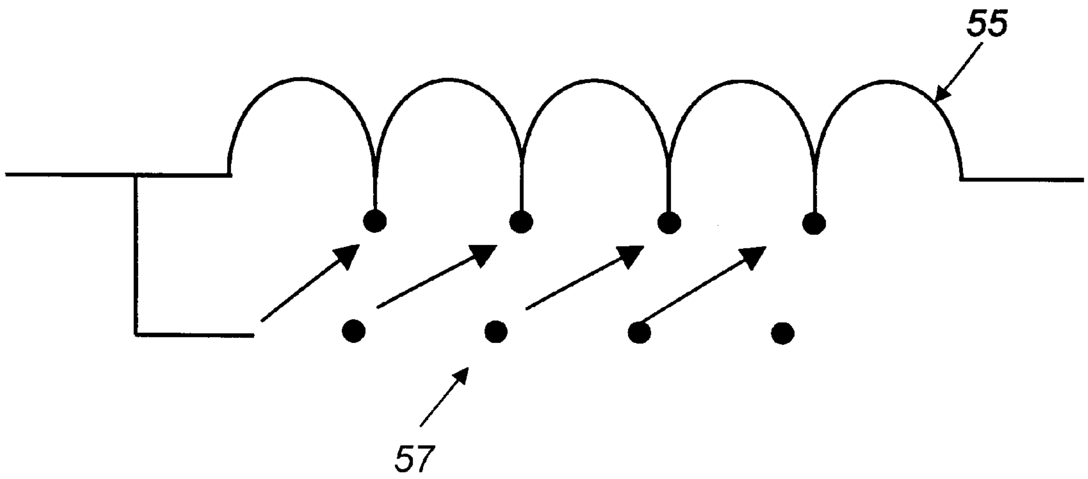
FIG. 5*b* is a conceptual diagram of the variable-inductance NLTL phase shifter illustrated in FIG. 5*a*.
Figure 5C:
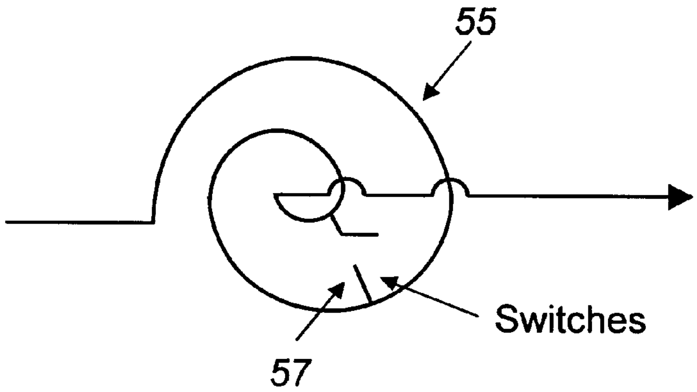
FIG. 5*c* is a physical diagram of the variable-inductance NLTL illustrated in FIG. 5*a*.
Figure 6:
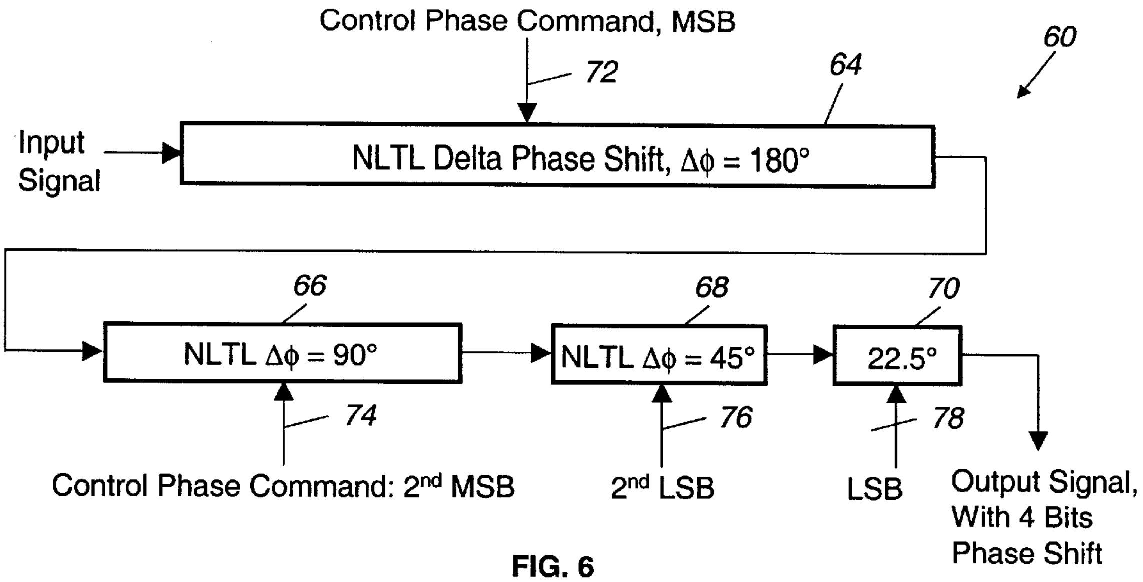
FIG. 6 is a block diagram of a digital NLTL phase shifter in accordance with another embodiment of the present invention.
Figure 7:
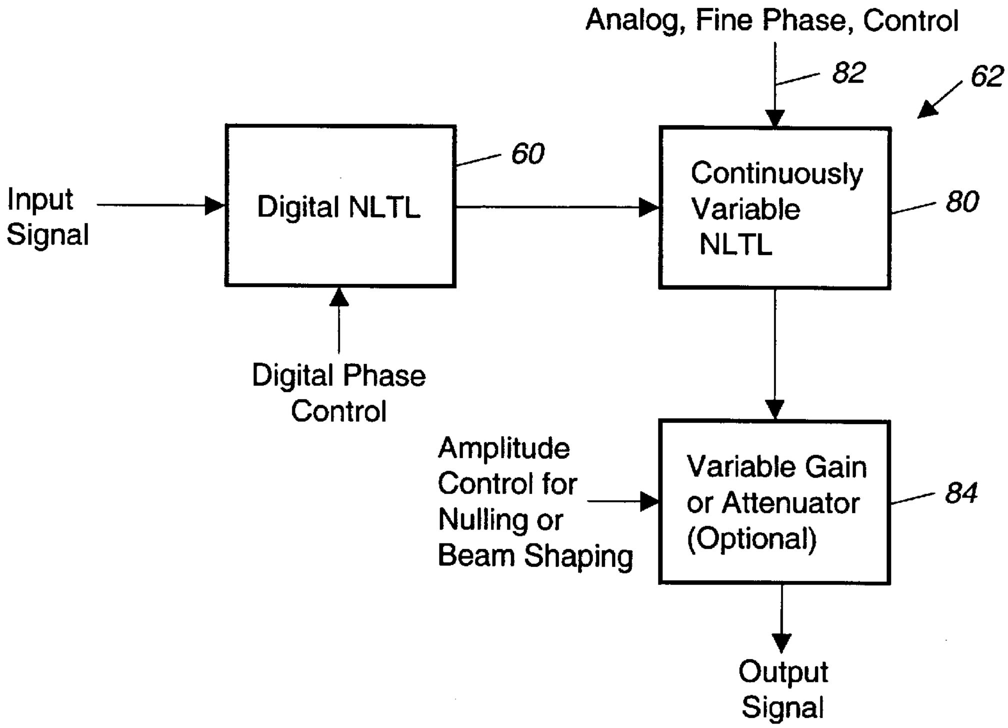
FIG. 7 is a block diagram of a continuously variable digital NLTL phase shifter in accordance with another embodiment of the present invention.

The present invention relates to phase shifters. All of the embodiments of the phase shifter in accordance with the present invention can provide variable phase shifts, programmable in real time, and have different features. More particularly, FIG. 3 illustrates one embodiment of the invention in which the voltage standing wave ratio (VWSR) of the input and output are maintained relatively constant. FIG. 4 illustrates a phase shifter in which the distortion is minimized. FIGS. 5*a*–5*c* illustrates a phase shifter in accordance with another embodiment of the invention suitable for relatively high frequency applications. FIGS. 6 and 7 relate to digital phase shifters. More specifically, FIG. 6 is a discretely variable phase shifter, while FIG. 7 shows a continuously variable digital phase shifter.

Each of these phase shifters in accordance with the present invention incorporates a variable delay element, such as a nonlinear transmission line NLTL, which can be either microstrip line, stripline, or a coplanar waveguide. Such nonlinear transmission lines are relatively well known in the art, for example, as disclosed in: "GaAs Non-linear Transmission Lines For Picosecond Pulse Generation and Millimeter Wave Sampling", by Rodwell et al., *IEEE Transactions on Microwave Theory and Techniques,* vol. 39, No. 7, pages 1194–1204; as well as "Novel Low-Loss Delay Line For Broad Band Phased Antenna Applications", by Zhang et al., *IEEE Microwave and Guided Wave Letters,* vol. 6, No. 11 November 1996, pages 395–397.

Figure 1:
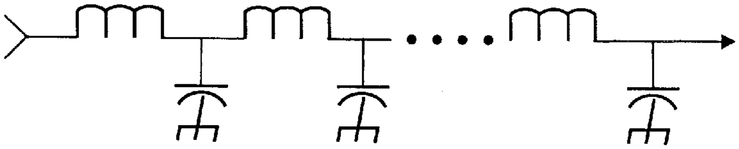
FIG. 1 is a schematic diagram of a nonlinear transmission line model.

Such nonlinear transmission lines (NLTL) are best understood in terms of a standard transmission-line model as illustrated in FIG. 1. As shown, the standard transmission line is modeled as a distributed network of series inductances and shunt capacitances. In an NLTL, the shunt capacitances are replaced with reverse biased diodes, which have varactor-like characteristics in which the capacitance varies inversely with the reverse voltage applied. Thus, as the DC bias voltage applied to the transmission line increases, the capacitance of the Schottky diodes decreases, thus changing the characteristic impedance and phase velocity of waves on the transmission line. The amplitude of the RF signals applied to the input must be relatively small relative to the DC bias to minimize the distortion of the RF signal.

Figure 2A:
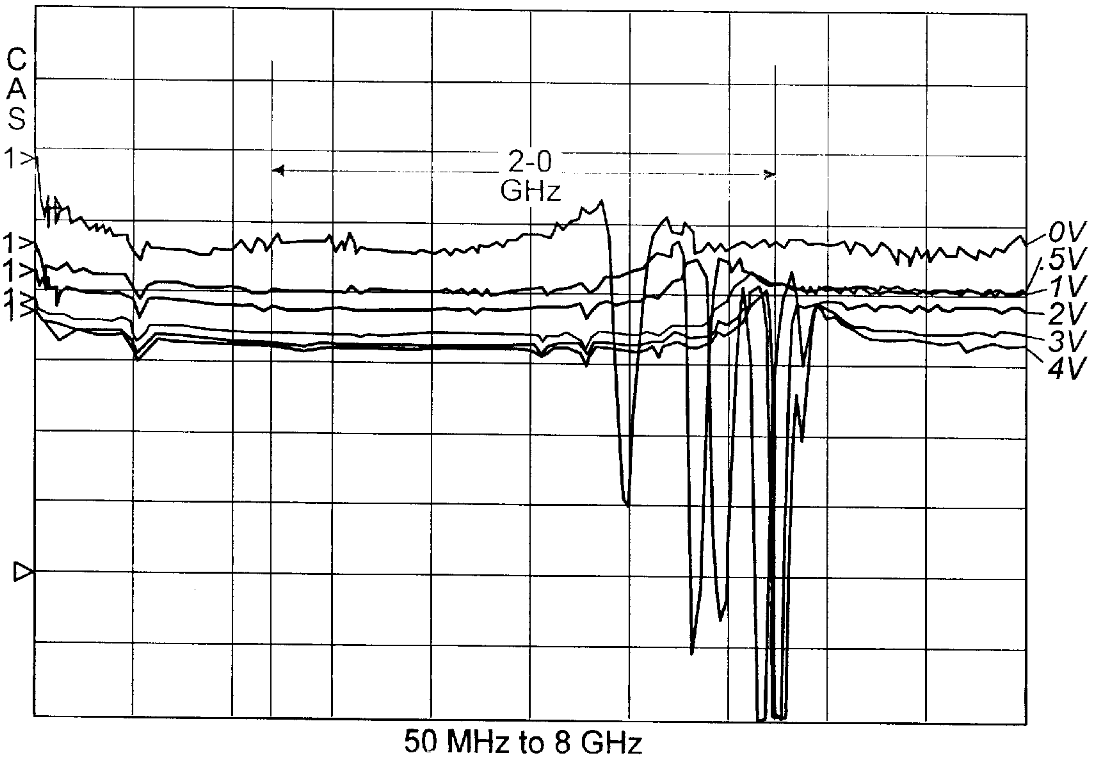
FIGS. 2*a* and 2*b* illustrate the delay of a nonlinear transmission line for different DC bias levels from 50 MHz to 8 GHz and from 8 GHz to 20 GHz, respectively, illustrating a relatively constant delay over a substantial bandwidth.
Figure 2B:
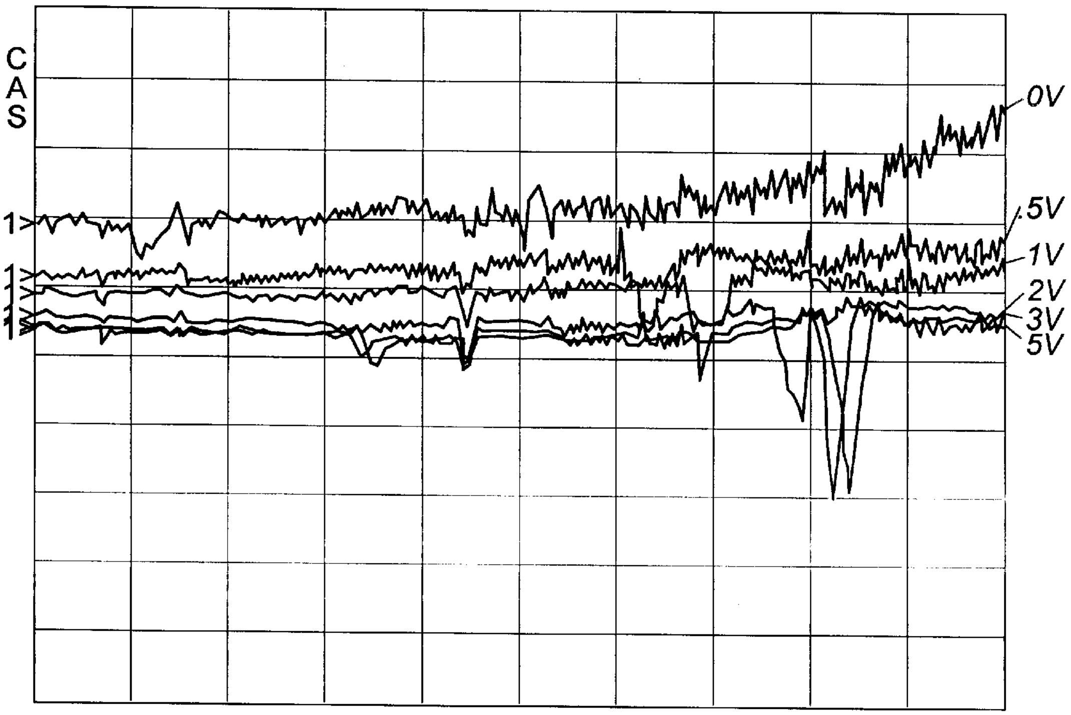

FIGS. 2*a* and 2*b* illustrate that the delay through a NLTL is fairly constant over a wide bandwidth. In particular, FIG. 2*a* illustrates the delay of a nonlinear transmission line from 50 MHz to 8 GHz at DC bias voltages 0,0.5, 1.0, 2.0, 3.0 and 4.0. FIG. 2*b* is similar, except that it describes performance over the frequency range 8 GHz to 20 GHz. As can be seen from FIGS. 2*a* and 3*b*, the delay at the various DC bias voltages is fairly constant over a relatively wide frequency range making such devices suitable for use in various applications.

However, there are several shortcomings associated with using an NLTL as a variable delay element. In particular, as the DC bias voltage applied to the input of the transmission line changes, the characteristic impedance of the line also changes, which, in turn, changes the input and output voltage standing wave ratio (VSWR). This problem is solved by the phase shifter 20 illustrated in FIG. 3. As will be discussed in more detail below, the phase shifter 20 is configured such that the input and output VSWR are balanced. More particularly, the phase shifter 20 includes a pair of hybrid couplers 22 and 24 and a pair of parallel connected NLTLs 26 and 28. As shown, one port of each of the hybrid couplers 22 and 24 is connected to a terminated impedance, for example, the 50Ω impedances 30 and 32.

Such a hybrid coupler divides the input signal power directed to the input port equally between two output ports. In particular, when one input of the hybrid coupler is connected to a termination whose impedance is equal to the system impedance, the input signal is divided between two output ports at ideally equal power but with a 90° phase difference. Such hybrid couplers 22 and 24 are well known in the art and are disclosed, for example, in U.S Pat. Nos. 3,988,705 and 4,375,054, hereby incorporated by reference.

The NLTLs 26 and 28 are connected between the 0 and 90° output ports of the input hybrid coupler 22 and the output hybrid coupler 24, configured in reverse. As mentioned above, the phase velocity and thus delay and phase shift of the NLTLs 26 and 28 is a function of the DC bias voltage applied to the NLTLs 26 and 28. Thus, by way of the phase control signals 34 and 36, external phase control (i.e, DC bias voltage) is applied to the NLTLs 26 and 28 to control the amount of phase shift through the device 20. The phase-control signals may be analog signals for continuously varying the phase shift through the phase shifter device 20. Alternatively, the analog DC bias may be controlled by a digital signal or a combination of the two.

The configuration of the phase shifter 20 is similar to a balanced amplifier. More particularly, the parallel and virtually identical NLTLs 26 and 28 along with the hybrid couplers 22 and 24 assure that the input and output impedances of the device and thus VSWR of the device are relatively constant. In addition, the two NLTLs 26 and 28 in parallel increase the dynamic range of the device by about 3 db. Thus, the phase shifter 20 is adapted to provide either a continuously or discretely variable phase shift while at the same time balancing the VSWR at the input and output of the device.

An alternate embodiment of the invention is illustrated in FIG. 4 and generally identified in reference numeral 40. The phase shifter 40 is similar to the phase shifter 20 with the exception that the hybrid couplers 22 and 24 are replaced with 180° power splitters 42 and 44. Such 180° power splitters are well known in the art. In this embodiment, the input power splitter 42 splits the input signal into equal power output signals at 0 and 180°. These signals are applied to a pair of parallel NLTLs 46 and 48, which, in turn, are coupled to an output 180° power splitter 44. In this embodiment, even-order distortion produced by the NLTL 46 to 48 is canceled by the output 180° power splitter 44. In this embodiment, even order distortion produced by the NLTLs 46 and 48 is canceled by the power splitter 44 in the same manner as a push-pull amplifier. Additionally, in such an embodiment the third order intercept point of the device as well as the dynamic range is improved relative to a single NLTL.

Similar to the phase shifter 20, continuously variable analog phase-control DC bias signals 50 and 52 can be applied to NLTL 46 and 48. Alternatively, digital phase-control signals 50 and 52 can control the DC bias applied to the NLTLs 46 and 48 to provide a discretely variable phase shifter 40, or a combination of the two.

FIGS. 5*a*–5*c* illustrates another embodiment of the invention, identified with the reference numeral 54. The phase shifter 54 is formed as a nonlinear transmission line, as discussed above, with a plurality of spaced variable capacitance elements, in this case, reverse-biased Schottky diodes and a plurality of inductors, for example, spiral inductors, connected in series. The variable-inductance nonlinear transmission line 54 is best understood with reference to FIGS. 5*b* and 5*c* which include, for example, a spiral coil 55 having multiple turns and a plurality of switches, generally identified with the reference numeral 57. In this embodiment, the inductance is varied by shorting out turns of the spiral 57 by way of the switches 57, effectively changing its length, thus providing a programmable inductance. In the embodiment illustrated in FIGS. 5*a*–5*e*, the adjustable inductance in addition to the variable capacitance allows even more control of the characteristic impedance of the NLTL resulting in a relatively broad band NLTL.

In accordance with another aspect of the invention, digitally controllable phase shifters are illustrated in FIGS. 6 and 7. More particularly, FIG. 6 illustrates a digital NLTL phase shifter in which the phase shift is discretely variable while FIG. 7 illustrates a digital phase shifter which includes a continuously variable NLTL for providing continuously variable phase shift capability. Such digitally controlled phase shifters are particularly suitable for phased array antennas, known to be generally controlled by digital signals. The devices disclosed in FIGS. 6 and 7 are controlled digitally in a way other by converting a digital control signal to an analog signal by way of a D/A converter. For example, the phase shifter 60, illustrated in FIG. 6, includes a plurality of NLTLs 64, 66, 68 and 70. The lengths of the NLTLs 64, 66, 68 and 70 are selected to provide different phase shifts. For example, the length of the NLTL may be selected to provide an exemplary 180° phase shift. The succeeding NLTLs 66, 68, and 70 are selected to provide one half of the phase shift of the preceding NLTL and thus are essentially one half the length of the preceding NLTL. Thus, the NLTL 66 provides a 90° phase shift, while the NLTL 68 provides a 45° phase shift and the NLTL 70 provides a 22.5° phase shift. In the exemplary digital phase shifter illustrated in FIG. 7, a 4-bit digital signal may be used to control the phase shifter 60. The most significant bit (MSB) 72 is used to control the NLTL 64, while the second MSB 74 is applied to the NLTL 66. Similarly, the second-least-significant bit (LSB) 76 is applied to the NLTL 68, while the LSB 78 is applied to the NLTL 70.

With the series configuration of the NLTLs 64, 66, 68 and 70, various combinations of different phase shifts can be provided. More particularly, for each of the NLTLs 64, 66, 68 and 70, there are two states to provide either a reference delay $T_o$, corresponding to bias voltage in a logical 0 state, or a predetermined delay $T_1$ corresponding to a DC bias voltage in a logical "1" state. For the exemplary number of four NLTLs illustrated in FIG. 6, a total of $2^4=16$ different delays are possible.

In operation, at the operating RF frequency, the NLTL 64, the longest NLTL, has a phase shift of $T_1-T_0=180°$. A nominal state delay occurs when all of the NLTLs 64, 66, 68 and 70 are in a logical "0" state, resulting in a delay $15T_0/8$. The minimum phase shift occurs when the shortest NLTL 70 is biased with a logical 1 so that the delay through the phase shifter is $7\ T_0/8+T_1 1/8$. The delta phase shift is $T_1-T_0/8$ or 1/8 of 180°=22.5°. The NLTL 68 provides a 45° phase shift. By selecting both the 45° and 22.5° phase shift, a 37.5° phase shift is achieved. By applying a logical "1" to the NLTLs 68 and 70 with logical "0s" applied to the NLTL 64 and 66, a 47.5° phase shift can be achieved. A logical "1" applied to all of the NLTLs 64, 66, 68 and 70 provides a 337.5° phase shift.

An important feature of the phase shifter 60 is the ability to calibrate and set each bit of the phase shifter 60, precisely. A logical "0" or "1" can be easily set to the precise voltage required to achieve desired phase shift virtually exactly. In conventional phase shifters, calibration is relatively complex.

An alternate embodiment of the phase shifter 60 is shown in FIG. 7. This embodiment is a continuously variable digital phase shifter, generally identified with the reference numeral 62. The continuously variable digital phase shifter 62 includes a digital phase shifter 60, as generally discussed above. The output of the digital phase shifter 60 is applied to a continuously variable NLTL 80. The phase shifter 80 may be a phase shifter 20, 40 or 54, as illustrated in FIGS. 4–6 above, or may simply be a nonlinear transmission line by itself with an analog continuously variable DC bias signal 82. For applications requiring beam shaping or beam steering, the output of the continuously variable NLTL 80 may be applied to an optional variable gain attenuator 84, used for nulling or beam shaping.

Obviously, many modifications and variations of the present invention are possible in light of the above teachings. Thus, it is to be understood that, within the scope of the appended claims, the invention may be practiced otherwise that as specifically described above.

We claim:

1. A phase shifter comprising:

a first hybrid coupler including first and second input ports and first and second output ports;

a second hybrid coupler including third and fourth input ports and third and fourth output ports;

a pair of nonlinear transmission lines (NLTLs) connected between said first and second output ports and said third and fourth input ports;

a first termination impedance coupled to said second input port, said first input port for receiving an input signal; and a second termination impedance coupled to said third output port, said fourth output port for outputting an output signal.

2. The phase shifter as recited in claim 1, further including means for generating a continuously variable DC bias signal, coupled to said pair of NLTLs for continuously varying the phase of said NLTLs.

3. The phase shifter as recited in claim 1, further including means for generating discrete DC bias signals, coupled to said NLTLs for discretely varying the phase of said NLTLs.

4. A phase shifter comprising:

a first power splitter having an input port and first and second output ports;

a second power splitter having third and fourth input ports and a fifth output port; and a pair of NLTLs coupled between said first and second output ports and said third and fourth input ports.

5. The phase shifter as recited in claim 4, wherein said first and second power splitters are 180° power splitters.

6. The phase shifter as recited in claim 1, further including means for generating a continuously variable DC bias signal, coupled to said pair of NLTLs for continuously varying the phase of said NLTLs.

7. The phase shifter as recited in claim 1, further including means for generating discrete DC bias signals, coupled to said NLTLs for discretely varying the phase of said NLTLs.

8. A variable digital phase shifter comprising:

a first NLTL for shifting the signal by a first predetermined phase shift; said first NLTL adapted to be controlled by a first digital control bit to provide a reference delay or a first predetermined delay.

9. The variable digital phase shifter as recited in claim 8, further including at least one additional NLTL for providing an additional predetermined phase shift, said additional NLTLs adapted to be controlled by additional bits to provide a second predetermined delay.

10. The variable digital phase shifter as recited in claim 9, wherein said additional predetermined phase shifts are multiples of said first predetermined phase shift.

11. The variable digital phase shifter as recited in claim 10, wherein said first predetermined phase shift is 180°.

12. The variable digital phase shifter as recited in claim 11, further including a continuously variable NLTL, said continuously variable NLTL including an NLTL and means for varying the DC bias voltage of said NLTL.

13. The variable digital phase shifter as recited in claim 12 further including a variable attenuator for controlling the amplitude of the output signal.

* * * * *